United States Patent [19]
Lutz et al.

[11] Patent Number: 5,057,217
[45] Date of Patent: Oct. 15, 1991

[54] INTEGRAL SUPPORTED FILTER MEDIUM ASSEMBLY

[75] Inventors: John H. Lutz, Claymont; James L. Manniso, Newark; Craig R. Rinschler, Hockessin, all of Del.; Gordon R. S. Smith, Northeast, Md.

[73] Assignee: W. L. Gore & Associates, Inc., Newark, Del.

[21] Appl. No.: 66,281

[22] Filed: Jun. 25, 1987

[51] Int. Cl.⁵ .................... B01D 29/39; B01D 29/33
[52] U.S. Cl. ................... 210/346; 210/486; 210/494.1
[58] Field of Search ............ 210/331, 346, 347, 486, 210/487, 494.1, 494.2, 494.3; 55/280, 484

[56] References Cited

U.S. PATENT DOCUMENTS

| | | | |
|---|---|---|---|
| 3,279,616 | 10/1966 | Bourdale | 210/487 |
| 3,358,843 | 12/1967 | Bourdale | 210/487 |
| 3,486,627 | 12/1969 | Ashby et al. | 210/486 |
| 3,623,614 | 11/1971 | Schmidt, Jr. | 210/486 |
| 3,737,036 | 6/1973 | Kasten | 210/486 |
| 4,045,350 | 8/1977 | Kupf et al. | 210/486 |
| 4,229,304 | 10/1980 | Fismer | 210/486 |
| 4,256,586 | 3/1981 | Roos et al. | 210/487 |
| 4,637,876 | 1/1987 | Dausoudil | 210/331 |

*Primary Examiner*—Robert A. Dawson
*Assistant Examiner*—Wanda L. Millard
*Attorney, Agent, or Firm*—Dena M. Weker

[57] ABSTRACT

An integral filter leaf assembly comprising microporous polymeric filter cloths heat-bonded to the apices of an undulating screen to form a strong unitary pressure resistant filter unit which essentially replaces filter leaf assemblies. The screen and felt sides of the filter cloths are preferably heat sealable thermoplastics, usually polypropylene to allow heat-bonding and heat-sealing of seams throughout for a unitary assembly strong in compression. Outer filter coat is preferably porous expanded polytetrafluoroethylene. Optionally, a circumferential stiff load-bearing frame may be enclosed within the assembly.

8 Claims, 3 Drawing Sheets

INTEGRAL SUPPORTED FILTER MEDIUM ASSEMBLY

BACKGROUND OF THE INVENTION

In the art of liquid filtration, one of the methods for separating solids slurried in liquids in large open tanks is to use a filter known in the art as a filter leaf assembly. Typically, one drops one or more large, usually rectangular, filter frames covered by a filter cloth or bag into the tank, draws a vacuum within the filter bag to draw the liquid to be filtered inside the bag, and pumps the liquid out of the bag. Each filter frame is lifted out of the tank periodically when it has become so loaded with solids as to reduce the filtration rate to an ineffective or uneconomic extent, and the solids are then knocked off by vibration, scraping, washing, shaking or other methods known in the art, the cake collected or concentrated in the filter apparatus, and the filter cycle repeated.

The filter bag used over the frame is usually a woven filter cloth, sewn at intervals into pockets which contain long molded plastic or metal stays or shapes inserted into the pockets to hold the cloth apart, to resist pressure, and to stiffen the bag.

The stays are as long as the filter cloth, molded into a shape which has channels or grooves for the liquid being filtered to flow within, and at the same time molded into a shape which is inherently strong enough to resist the pressure on the outside of the filter when it is nearly clogged by a thick cake of solids.

The support frame is usually rectangular, supports the pocketed envelope shaped filter cloth, the drain channel stays or shapes, and a filtrate receiver collector which may be a wood, metal, or plastic header or manifold. The top of the filter cloth is gathered and sealed for a vacuum-tight closure to the filter assembly on this header or manifold. A typical example of this type of filter is a Diastar tradenamed filter apparatus developed by Filters Gaudfrin (France). Also known are Moore filters, of similar construction, which have been used in gold mining and the sulfate process for titanium dioxide.

All the presently known filter leaf assemblies, where reversed flow is used, have in common a number of problems. The filter cloth has to be sewn to form pockets to hold drain inserts which prevent the filter cloth from collapsing under pressure. The drain inserts themselves block off some of the flow of filtrate. Needle holes from sewing must be sealed to prevent filtrate leakage. This can be expensive and time consuming. Since many pockets are needed to provide adequate drainage, sewing itself becomes expensive. Also, standard filter media such as felts and cloths tend to clog with solids which penetrate into the interstices to cause high operating pressures and reduced through-put.

Also known are ridged and corregated plates, sometimes manufactured from nets of expanded metal sheets, which can be inserted into filter bags for similar filtration as disclosed by Roos U.S. Pat. No. 4,256,586.

Other types of corregated filter media are known, such as the filter panels of Bourdale, as shown in U.S. Pat. Nos. 3,358,843 and 3,279,616, which are useful in filter cartridges.

Corregated plates have been used between filter elements in stacked annular filter arrangements, such as those provided by Gutkowski U.S. Pat. No. 3,209,915.

BRIEF DESCRIPTION OF THE INVENTION

The principal object of the present invention, however, is to provide a singularly light-weight and efficient substitute or replacement for heavy canvas or cloth filters which do not filter particularly well, clog easily during the filtering cycle, and sometimes present expansion problems or bag outwardly during the cleaning cycle.

The present invention provides an integral light-weight and efficient filter medium by bonding, preferably by heat, a thermoplastic screen of mesh size about $\frac{1}{4}''$ to $\frac{3}{8}''$ square which has been bent into a regular repeating angled or sine-curved shape, to the thermoplastic-organic polymer felt sides of two sheets of composite microporous organic polymeric membrane/thermoplastic organic polymeric textile felt. The filter media composites bonded to the screen give an integral corregated structure of relatively great compression strength, which can resist easily the pressures developed during the filtration cycle and subsequent backpulse cycle if used. Sewing is not utilized to form either the filter envelope or filter drain pockets. The microporous membranes provide leakproof, efficient filtration by means of low pressure drop, high product throughput, near-complete filter cake release, high filtrate clarity, and prolonged filter life and can be selected from materials, such as polytetrafluoroethylene, which can be cleaned easily during the wash cycle, as the filter cake will not adhere to them very well. The bonded integral filter leaf filter of this invention eliminates most of the problems associated with filter leaf filters in the past, in particular those associated with media clogging and sewn construction.

DETAILED DESCRIPTION OF THE PREFERRED EMBODIMENTS

Figure 1:
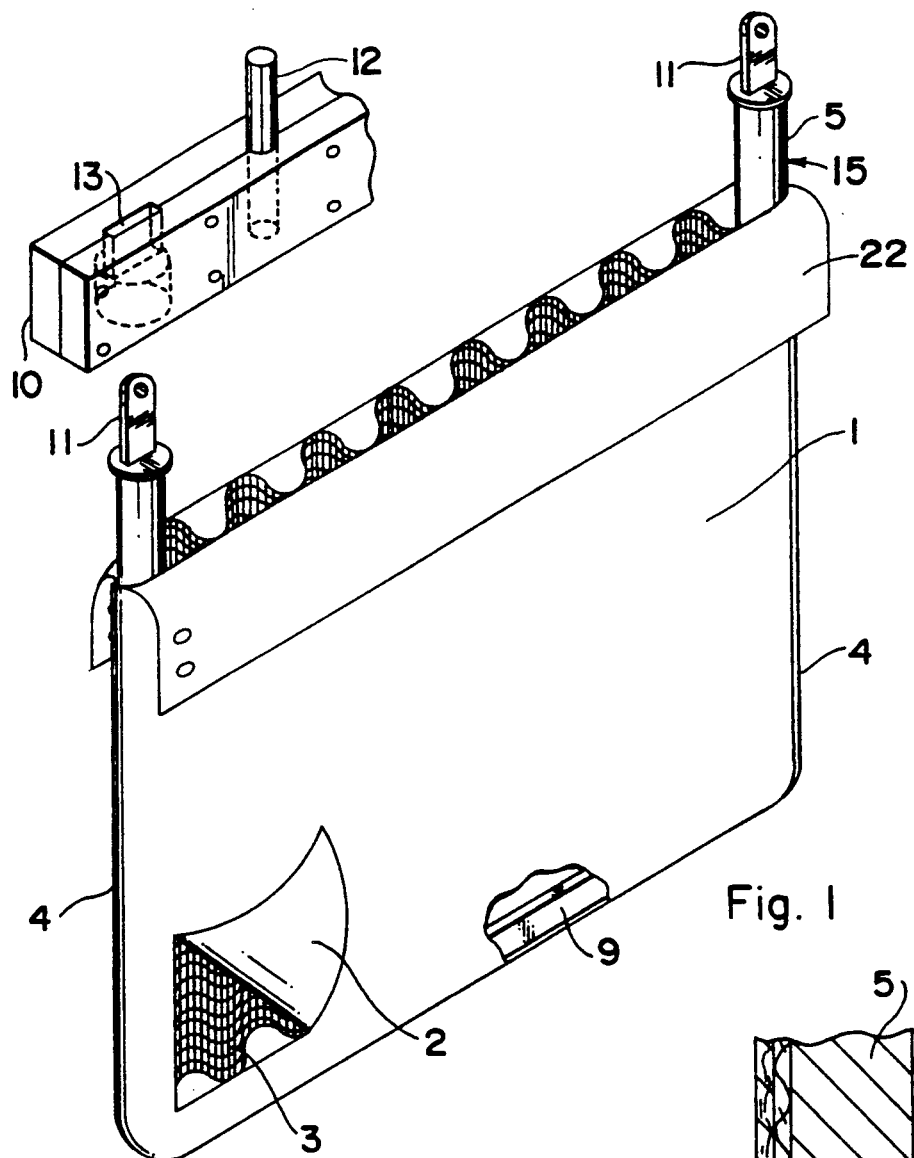
FIG. 1 is a perspective view of the filter leaf assembly, open at the top to reveal the undulating screen separator and lower cut-away portions to the interior near the bottom of the screen. A cut-away portion of the header or manifold to which the screen and filter cloth portions are attached is also given.

Referring now to the figures, 1 is the integral filter leaf cloth assembly of the invention as shown in FIG. 1. Flaps 22 of the composite filter cloth 2 used in the invention are drawn aside or bent back so as to reveal the interior of the assembly, which consists of the frame 15 and the screen 3. In FIG. 1 the top of the two side members 5 of the frame are revealed and the bottom member. The top bar or frame member is a header 10 or manifold 10 formed from several pieces of metal, wood, or plastic which fit together to form a bar which is shaped and arranged to hold in place the ends of the side members 5 of the frame. The top portion of the filter cloth is clamped or held in place about the header 10 by means for effecting a liquid and/or gas-tight seal between the filter cloth and the header/manifold 10. Lifting lugs 11 are fitted to the side member 5 of the frame to provide a means for removing a frame from a tank of material to be filtered. A vacuum port 12 is set into manifold 10 to provide access to the interior for drawing off filtrate under vacuum and slot 13 is provided to accommodate passage of lifting lug 11.

The undulating thermoplastic polymer screen 3 holds apart the two layers of filter cloth and is bonded, preferably by heat sealing, at the apex of each fold to the filter cloth. The filter cloth 2 is faced felt side to the screen and bonded felt to screen.

A heat-sealed side seam 4 is also made at each side of the assembly, felt-to-felt to provide a strong liquid- and gas-sealed seam of considerable mechanical strength.

The side members 5 of the frame may be pipe or tubing of metal or possibly plastic materials resistant to pressure and corrosion by the materials being filtered, and strong and stiff enough to form a frame of adequate strength for the loads being carried on the filter frame. They may also be solid and may be also entirely absent in some cases where no great strength is required for lifting heavy loads by means of the frame. The side members 5 attach to a bottom member which is of similar materials, shaped to hold the ends of the side members 5. Bottom bar 9 shows through a cut-away section of the filter cloth.

Figure 2:
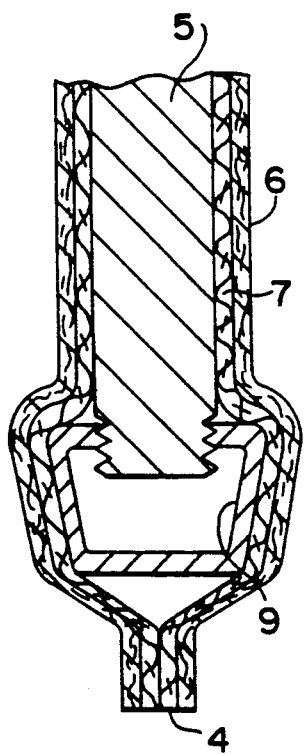
FIG. 2 is a cross-section of a segment of the screen through a side member and bottom member of the support frame and through the polymeric membrane filter cloth composite and edge seal.

FIG. 2 shows a cross-section of the end of a frame side member 5 heat sealed 4 inside two layers of filter cloth. Member 5 is screw-threaded into frame bottom bar 9 at its end and the filter cloth composite layers of microporous organic polymeric membrane 6 and organic polymeric textile felt 7 shown in proper relation to the frame bars and the seal 4 effected by heat felt layer to felt layer. Side members 5 and bottom bar 9 are not always hollow and may be entirely absent or not always needed.

Figure 3:
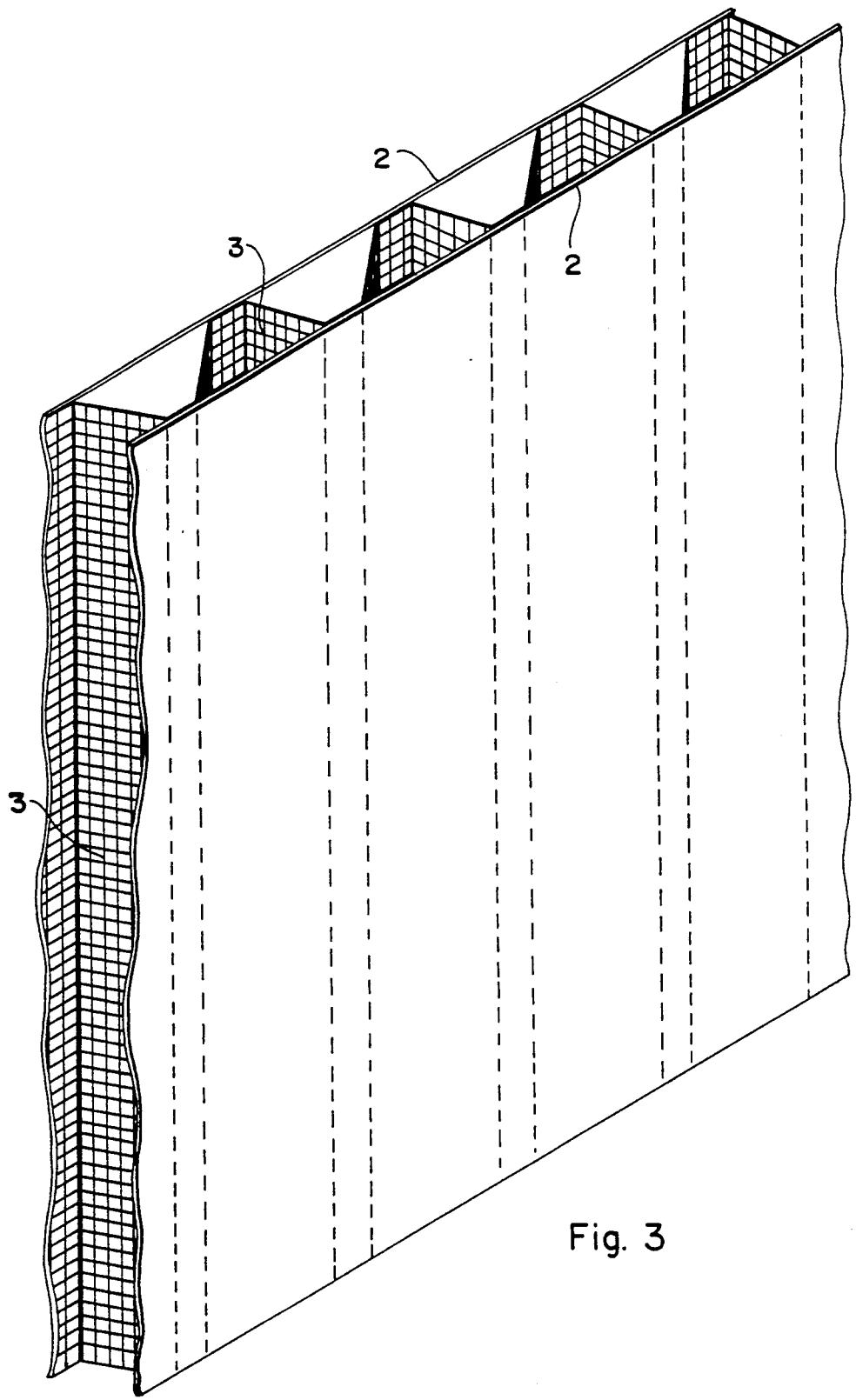
FIG. 3 depicts a segment of an example of the bonded integral filter.
Figure 4:
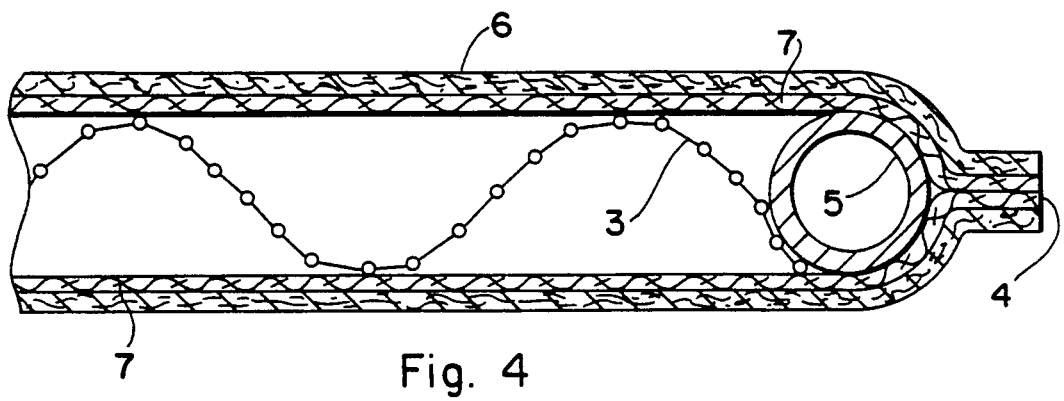
FIG. 4 shows a segment of a lateral cross-section through the filter leaf assembly.

FIG. 3 describes a section of the integral bonded filter leaf assembly of the invention, where the undulating thermoplastic screening 3 material and the filter cloth 2 are shown in structural relationship. FIG. 4 shows a lateral cross-section through a portion of the assembly with a side seam heat-seal 4 of the two layers of filter cloth, felt-to-felt, about the frame side member 5 and the undulating thermoplastic polymeric screen 3 bonded along each apex to the felt sides of 7 the filter cloths. Side member 5 may be solid or entirely absent in some cases, in which case the two layers of filter cloth would be sealed together around the end or edge of section of the screen 3.

Heat-sealing, felt-to-felt or felt-to-screen, is the preferred way of forming the filter cloth assembly of this invention, but hot-melt adhesive bonding or other adhesives or glues could be used. The heat, for instance, could be supplied by laser, ultrasonically, by hot air, infrared radiation, or by other means known in the art. It is necessary to form bonds adequately strong to hold the materials of the filter cloth and screen together under the conditions of temperature, pressure, corrosion, and the static and dynamic weight loads present in the filtrations being performed by the assembly of the invention. Reasonable strength is also needed if the filter cake is to be dislodged from the filter surface with aid of back pressure or reverse pressure bumping, or other back pressure methods often utilized for this purpose. It is intended that at least some embodiments of the filter assembly of the invention be strong enough for such methods.

In the filter cloth portion of the assembly, the microporous organic polymeric membrane is preferably made from a porous form of polytetrafluoroethylene (PTFE), the most preferred materials being the expanded microporous forms (ePTFE) of PTFE disclosed in U.S. Pat. Nos. 4,187,390; 4,110,392; 4,096,227; 4,025,679; 3,962,153; and 3,953,566. Other porous PTFE filter materials prepared by different processes, and other porous polymer membrane materials, but known in the art to be useful as filter materials, and in laminates, and assemblies thereof may also be used. The properties of resistance to corrosion and presentation of a non-stick surface to materials being filtered off make the PTFE materials preferred, although for many filtrations, microporous membranes formed from other organic polymers would also be functional, such as a microporous polypropylene membrane. Also applicable would be more conventional filter media.

The organic polymeric textile felt, bonded or laminated to the microporous membrane to form the filter cloth, is preferably polypropylene. Other textile felts known in the filtration art to be useful for such composite filter cloths may also be used, such as a felt of polyester fiber, glass fiber, PTFE fiber, or others. A unitary thermoplastic filter material may be used.

Figure 5:
FIG. 5 and FIG. 6 describe alternate forms of thermoplastic polymer screen for use as core screening material in the assembly.
Figure 6:

The thermoplastic organic screen material, which is formed into an undulating configuration, such as a regular sine wave configuration, or into an angled (FIG. 5) or flattened angled (FIG. 6) configuration, is placed between two sheets of the filter cloth as described above, with the textile felt sides of the filter cloth adjacent the screen, and heat-bonded to each apex by the same methods as described above. The unitary assembly so formed has considerable compression strength which is what is needed to prevent collapse under pressure filtration conditions. The assembly has tested to support about 1 atm. compression, but is normally used at about 5 to 15 pounds per square inch. The bonding prevents expansion or bagginess of the filter cloths during the cleaning cycle when the pressure is reversed and comes from within the filter assembly. Common thermoplastic screening of about one half inch square opening screen size and made from, for example polypropylene, is appropriate for this application, is easily warmed and bent over a mold to the desired undulating sine wave or angled configuration, cooled, heat-bonded to the felt sides of two filter fabric composites, formed around a frame, edges trimmed and heat-sealed around the frame or the edges of the unitary assembly, and the assembly closed and sealed at the top. Other screen aperture sizes may be used as appropriate for strength or other reasons. Other themoplastic polymers and glass-fiber reinforced plastic screen materials may also be used. Glass fiber screening and metal screening materials may also be used in some cases in conjunction with supplemental thermoplastic material or adhesives to aid in bonding the filter membrane to the screening material.

The filter assembly frame may be of metal pipe or tubing or bent metal shapes formed so as to not puncture the filter cloth easily under pressure or the usual movement necessary to use of the filter assembly. The exact form is not critical to the invention and the pipe, metal shape, and wood header or manifold top bar which presently make up the frame being used in the art can be used in one of the embodiments of the present invention. This invention in effect replaces the canvas filter cloth sewn into pockets and containing plastic shapes to hold the sides apart now supported on the above frame.

Alternatively, the metal frame of the assembly may be substituted by suitable plastic pipes and molded shapes of appropriate composition and strength. The header or manifold may take the form of a molded plastic header or the form of a potted plastic manifold wherein the ends of the filter cloths, screen, and side bars are potted in a plastic form designed and formed to hold them and also a means for removing the liquid filtered through the filter cloths of the assembly. Methods well known in the art for potting ends of filters in plastic or metal forms can be utilized for this.

It will be apparent to those skilled in the art that various modifications and changes in methods and materials could be made for making and using this invention without departing from the scope or spirit of the invention.

We claim:

1. A leakproof integral leaf filter assembly comprising:
   (a) an undulating screen bonded at its apices between
   (b) two sheets of composite filter cloth, each of said filter cloth sheets comprising a microporous membrane bonded to a thermoplastic polymer textile felt wherein said screen is bonded to the felt side of said composite filter cloth sheets,
   (c) said composite filter cloth sheets extending beyond the edge of the screen so as to enclose and be securely bonded about side and bottom members of the screen and to provide material for sealably closing the top of the assembly about
   (d) a header or manifold assembly for gathering and removing filtrate from the filter.

2. An assembly of claim 1 wherein the microporous membrane is polytetrafluoroethylene.

3. An assembly of claim 1 wherein the undulating screen comprised a thermoplastic polymer.

4. An assembly of claim 1 wherein the textile felt is formed from polypropylene.

5. An assembly of claim 1 wherein the screen is formed from polypropylene.

6. An assembly of claim 1 wherein the shape of the screen is selected from the group of regular sine wave, series of angles, and series of flattened angles.

7. An assembly of claim 1 wherein a relatively stiff and load-bearing frame having side members, a bottom member, and a top member is disposed around the circumference of the filter assembly to aid in load bearing.

8. An assembly of claim 1 wherein the composite filter cloth sheets are each formed form a unitary thermoplastic filter material.

* * * * *